United States Patent

[11] 3,627,746

[72] Inventors Charles D. Beals;
George I. Fitzpatrick; Kim L. O'Hara, all of Baton Rouge, La.
[21] Appl. No. 41,242
[22] Filed May 25, 1970
[45] Patented Dec. 14, 1971
[73] Assignee Esso Research and Engineering Company

[54] LDPE RECYCLE SYSTEM DEFOULING METHOD
5 Claims, 1 Drawing Fig.
[52] U.S. Cl. .................................................... 260/94.9 P, 260/94.9 R
[51] Int. Cl. ........................................................ C08f 3/04
[50] Field of Search .......................................... 260/94.9 P, 94.9 R

[56] References Cited
UNITED STATES PATENTS
2,396,791 3/1946 Krase et al. ..................... 260/94.9
3,306,889 2/1967 Schappert ...................... 260/94.9

Primary Examiner—Joseph L. Schofer
Assistant Examiner—A. Holler
Attorneys—Thomas B. McCulloch, Melvin F. Fincke, Timothy L. Burgess, John S. Schneider, Sylvester W. Brock, Jr. and Kurt S. Myers ABSTRACT: A series of recycle coolers in a high-pressure polyethylene system are defouled by circulating ethylene feed using a compressor through the polyethylene system without addition of initiator and through the series of recycle coolers and maintaining during the sequential heating of each of said series of recycle coolers a temperature at the inlet of the compressor of the circulating feed less than the design temperature of the compressor which may be between about 150° to 225°F.

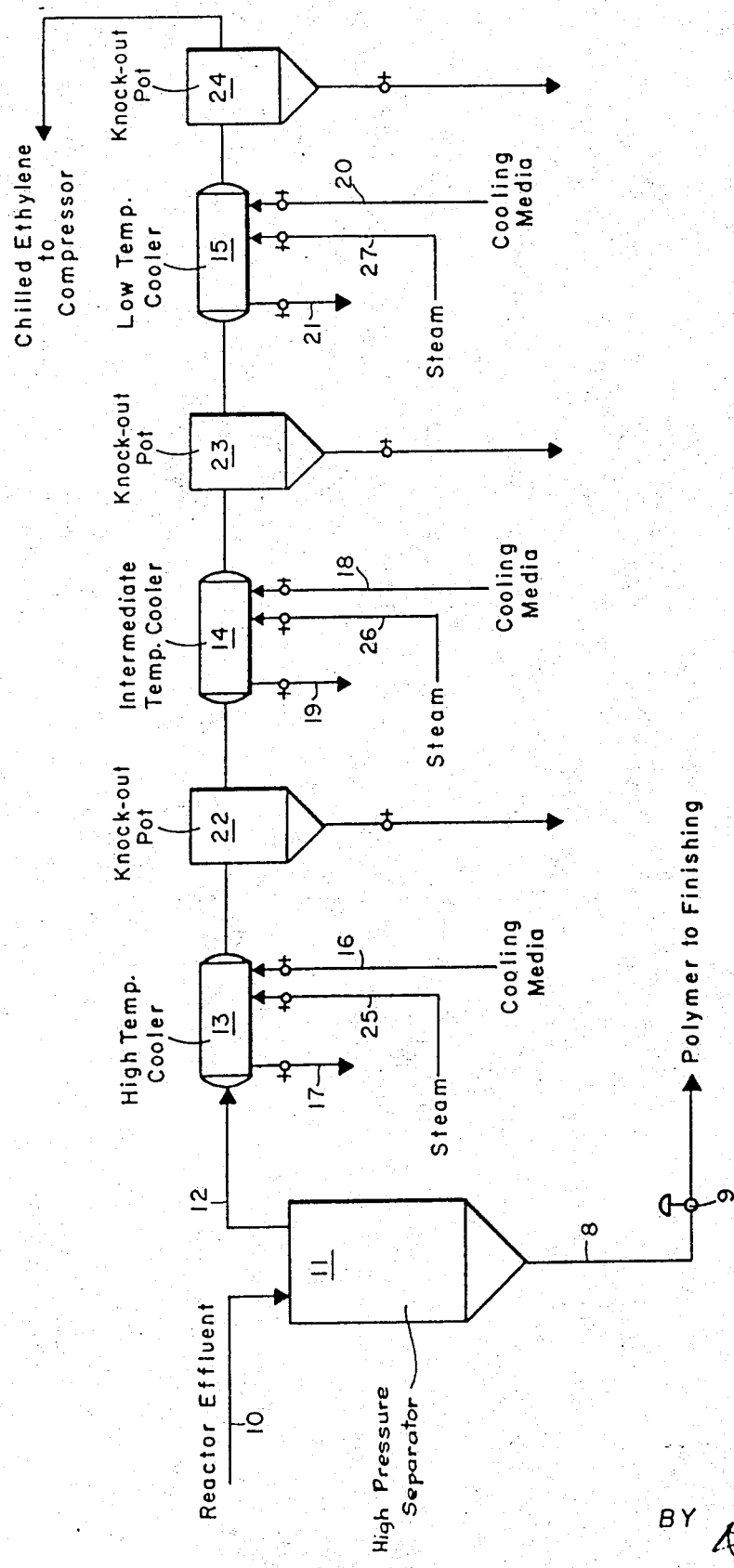

LDPE RECYCLE SYSTEM DEFOULING METHOD

BACKGROUND OF THE INVENTION

1. Field of the Invention

The present invention is directed to a method for defouling a series of recycle coolers in a high-pressure polyethylene system.

2. Prior Art

Heretofore, the defouling method of recycle coolers in a high-pressure polyethylene system has occurred as the ethylene is being polymerized. Such in-line defouling method is ineffectual in sustaining improved recycle cooler performance in that the lowest temperature recycle cooler can not be effectively defouled since it is not economically feasible to design a polyethylene secondary compressor to operate at design discharge pressures and capacities and simultaneously with high suction temperatures (150°–225° F.). Other defouling procedures involve mechanically cleaning tubes of the recycle coolers while the high-pressure polyethylene system is shut down.

It has now been discovered that an improved defouling method of the recycle coolers may be used utilizing the circulating ethylene feed with no polymerization occuring. The method may be carried out advantageously just prior to shutting down or starting up the polyethylene system.

SUMMARY OF THE INVENTION

The present invention may be briefly described as a method for defouling a series of recycle coolers in a high-pressure polyethylene system. Ethylene feed is circulated through the reactor in the polyethylene system without addition of initiator and, accordingly, without polymerization occurring and through the series of recycle coolers. The first in the series of recycle coolers is heated sufficiently to remove polymer from that recycle cooler. The temperature required is higher than is required for the following recycle coolers. The polymer is collected in a knockout pot following each recycle cooler. Each of the remaining recycle coolers is sequentially heated to remove the polymer as the defouled recycle coolers are placed back in service for the necessary cooling of the recycled ethylene feed. The ethylene feed stream is maintained during the defouling of the last of the series of recycle coolers so as to maintain a temperature at the inlet of the compressor between about 150° to 250° F. Preferably, each of the recycle coolers is heated by steam to obtain the desired heating in the cooler in the shortest period of time.

DESCRIPTION OF THE DRAWING

The present invention will be further illustrated by reference to the drawing in which:

The single FIGURE illustrates a series of recycle coolers in a high-pressure polyethylene system.

DESCRIPTION OF THE PREFERRED EMBODIMENT

Referring now to the drawing, the reactor effluent is introduced by line 10 into a high-pressure separator 11. The gases are removed by line 12 for recycling while the polyethylene is removed by line 8 through let down valve 9 to finishing. In the recycle line 12 are a series of recycle coolers and knockout pots for cooling and dewaxing the recycle stream before introducing it into a compressor (not shown). The cooling is done in stages through a series of recycle coolers illustrated by coolers 13, 14, and 15. A series of recycle coolers is used since fouling is most severe at large temperature drops.

The recycle cooler 13 is provided with cooling media by line 16 and an outlet line 17 wherein hot water, for example, may be circulated. In the intermediate temperature recycle cooler 14, cooling media is introduced by line 18 and is removed by line 19, and cooling water, for example, may be used as the cooling media. In the low-temperature recycle cooler 15, cooling media is circulated through line 20 and removed by line 21 and chilled water, for example, may be used. Following each of the recycle coolers 13, 14, and 15 is a knockout pot for collecting polymer. Knockout pot 22 follows recycle cooler 13, knockout pot 23 follows recycle cooler 14 and knockout pot 24 follows recycle cooler 15. Each of the recycle coolers 13, 14, and 15 may be standard elevated pressure tube bundle heat exchangers with the recycle gases passing through the tubes and the cooling media circulating through the shell side of the heat exchanger. It is preferred, according to the present invention, to provide lines 25, 26, and 27 to each of the recycle coolers 13, 14, and 15, respectively, so that steam may be circulated or introduced to the shell side of the heat exchanger in place of the cooling media.

According to the present invention, the ethylene feed is circulated by the compressor (not shown) through the reactor in the polyethylene system and into the reactor effluent stream 10 and into the high-pressure separator 11. The reactor, such as a tubular reactor or an autoclave reactor, is operated with maximum heating on all jacket sections to maintain the high-pressure separator 11 gas temperature at about 350° to 450° F. The reactor pressure is minimized by operating with the high-pressure letdown valve (not shown) open. Accordingly, the pressure in the polyethylene system is less than 10,000 p.s.i., preferably.

The first of the recycle coolers 14 may be heated for defouling by blocking the circulation of cooling media by closing the valves in lines 16 and 17. It is preferred, however, to heat the cooler by draining the cooler 13 of the heat exchange media and introducing steam by line 25. The ethylene feed is circulated for about 10 minutes as the temperature in recycle cooler 13 is raised. The polymer which has collected in cooler 13 is removed and collected in knockout pot 22. The temperature of the circulating ethylene feed is reduced in recycle coolers 14 and 15 sufficiently so that the temperature at the inlet to the compressor does not exceed about 250° F.

After the recycle cooler 13 has been defouled, it is placed back in service by again circulating the cooling media through lines 16 and 17 in sufficient amount so as to aid in the cooling of the recycle feed. Suitable exit temperature from the defouled cooler 13 may be between 150° to 300° F.

Recycle cooler 14 is then heated by either blocking in the cooling media by closing the valves in lines 18 and 19 or, preferably, the cooler 14 is drained and steam introduced by line 26. The recycle ethylene feed is continued for about 10 minutes as the intermediate temperature recycle cooler 14 is heated. The polymer which is removed therefrom is collected in knockout pot 23. Thereafter, the recycle cooler 14 is placed back in service by again circulating cooling media through lines 18 and 19 in sufficient amount so as to aid in the cooling of the recycle ethylene feed. Suitable temperatures of the recycle ethylene feed, as it leaves defouled recycle cooler 14, may be about 150° to 225° F.

Recycle cooler 15 is then heated by either blocking in the cooling media by closing the valves in lines 20 and 21 or, preferably, the cooler 15 is drained and steam introduced through line 27. The temperature is increased in recycle cooler 15 sufficiently to remove the polymer therefrom and is collected in knockout pot 24. The temperature of the circulating ethylene feed is controlled such that the temperature at the inlet of the compressor is such that the ethylene feed will not exceed the design conditions of the compressor as the feed is circulated there through. This may suitably be at inlet temperatures between 150° and 225° F.

After all of the recycle coolers are defouled by the foregoing method, the temperature of the ethylene feed as it is recycled to the compressor in the polyethylene system and polymerization or normal operation is resumed may be within the range of 60° to 120° F. and, preferably, as low as 60° to 80° F. By having all the recycle coolers clean of polymer and operating at their maximum efficiency, the inlet temperature to the compressor may be reduced just after defouling 20° to 50° F. and, on the average, approximately 10° to 25° F. before again defouling and, therefore, increases the compressor capacity.

The nature and object of the present invention having been completely described and illustrated and the best mode contemplated set forth, what we wish to claim as new and useful and secure by Letters Patents is:

1. A method for defouling a series of recycle coolers in a high-pressure polyethylene system comprising a reactor in a series of steps which comprises:

circulating gaseous ethylene feed by using a compressor through the reactor in said polyethylene system without addition of initiator and in the absence of polymerization and then through said series of recycle coolers, heating by indirect heat exchange the first of said series of recycle coolers sufficiently to remove polymer from that heated recycle cooler as gaseous feed is circulated therethrough at a temperature of about 350° to 450° F.

collecting polymer from said circulating feed after passing through said first heated recycle cooler, sequentially heating by indirect heat exchange each of the remaining of said series of recycle coolers as gaseous feed is circulated therethrough and collecting the polymer therefrom while resuming cooling in each previously heated recycle cooler, and maintaining during the sequential heating of each of said series of recycle coolers a temperature at the inlet of said compressor of said circulating feed between about 150° to 225° F.

2. A method according to claim 1 wherein said polyethylene reactor is a tubular reactor.

3. A method according to claim 1 wherein said polyethylene reactor is an autoclave reactor.

4. A method according to claim 1 wherein said increasing of temperature is obtained by blocking-off coolant.

5. A method according to claim 4 wherein said increasing of temperature is further obtained by draining the cooler and the addition of steam.

* * * * *